United States Patent [19]
Li

[11] Patent Number: 6,079,290
[45] Date of Patent: Jun. 27, 2000

[54] ROLLATOR BRAKING DEVICE

[76] Inventor: Charles Li, 10F-3, No. 31, Lane 169, Kang Ning St., Hsi Chih Chen, Taipei Hsien, Taiwan

[21] Appl. No.: 09/241,906

[22] Filed: Feb. 2, 1999

[51] Int. Cl.[7] .................................................. F16C 1/12
[52] U.S. Cl. ............................... 74/502.2; 74/489
[58] Field of Search ............................ 74/502.2, 501.6, 74/489, 526

[56] References Cited

U.S. PATENT DOCUMENTS

| | | | |
|---|---|---|---|
| 5,279,180 | 1/1994 | Henriksson | 74/502.2 |
| 5,865,065 | 2/1999 | Chiu | 74/502.2 |
| 5,896,779 | 4/1999 | Biersteker et al. | 74/502.2 |

*Primary Examiner*—Mary Ann Battista
*Attorney, Agent, or Firm*—Rosenberg, Klein & Lee

[57] ABSTRACT

A rollator braking device for mounting on a handle is provided which includes a base, a rod and a grip. The base is fastened to the handle of the rollator and an accommodating space is formed inside. A positioning protrusion is formed at a middle section of an inner wall of the accommodating space, and a stopper wall is formed at a bottom portion of the accommodating space. One end of the rod is pivotally coupled to the base, while the other end of the rod is coupled to the steel cable of a braking wire. The grip is pivotally coupled to the rod, at its middle section, with the protruding end at the top of the root of the grip acting as a fulcrum against the pivot of the rod. Two noses are formed at the middle section of the root of the grip, and a holding tongue is formed at one side of the lower end of the root. When the grip is pushed downward, the tongue acts as a fulcrum against the stopper wall and becomes a sliding support while the braking wire is pulled by the biased swinging of the rod being pulled by the pivotal coupling with the grip. When the grip is pushed all the way down, the noses hold against and stop at the positioning protrusion to maintain a fixed braking status until manually released.

1 Claim, 8 Drawing Sheets

ROLLATOR BRAKING DEVICE

BACKGROUND OF THE INVENTION

1. Field of the Invention

The present invention relates to a handy care rollator braking device, and more particularly to a device to achieve braking motion either by pushing or pulling a controller grip of the brake, to allow smooth and stable operation by the use of a rod, and to temporarily hold still the motion of pushing to brake so that the rollator user does not have to hold on to the brake.

2. Description of the Prior Art

Figure 7:
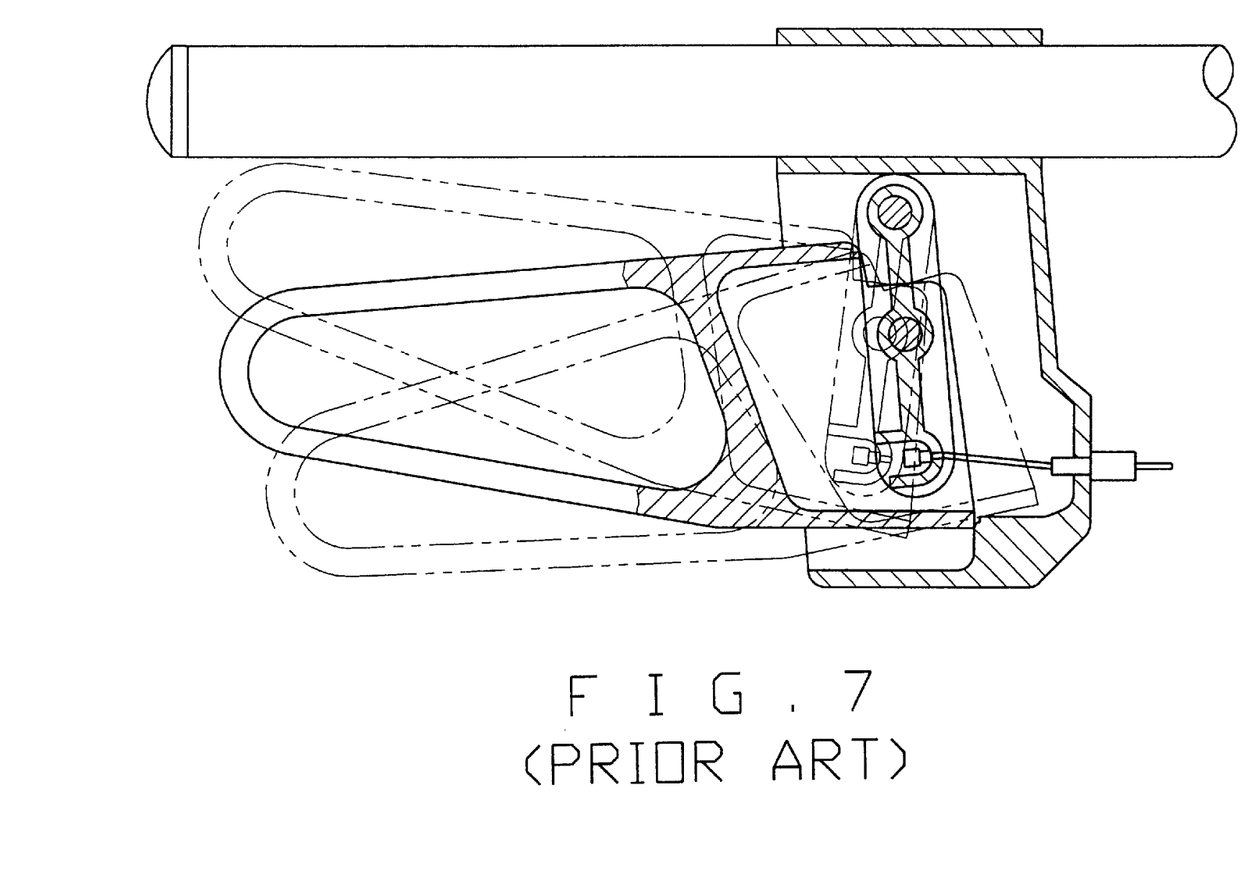
FIG. 7 is a view of the structure and the operation of a prior art.
Figure 8:
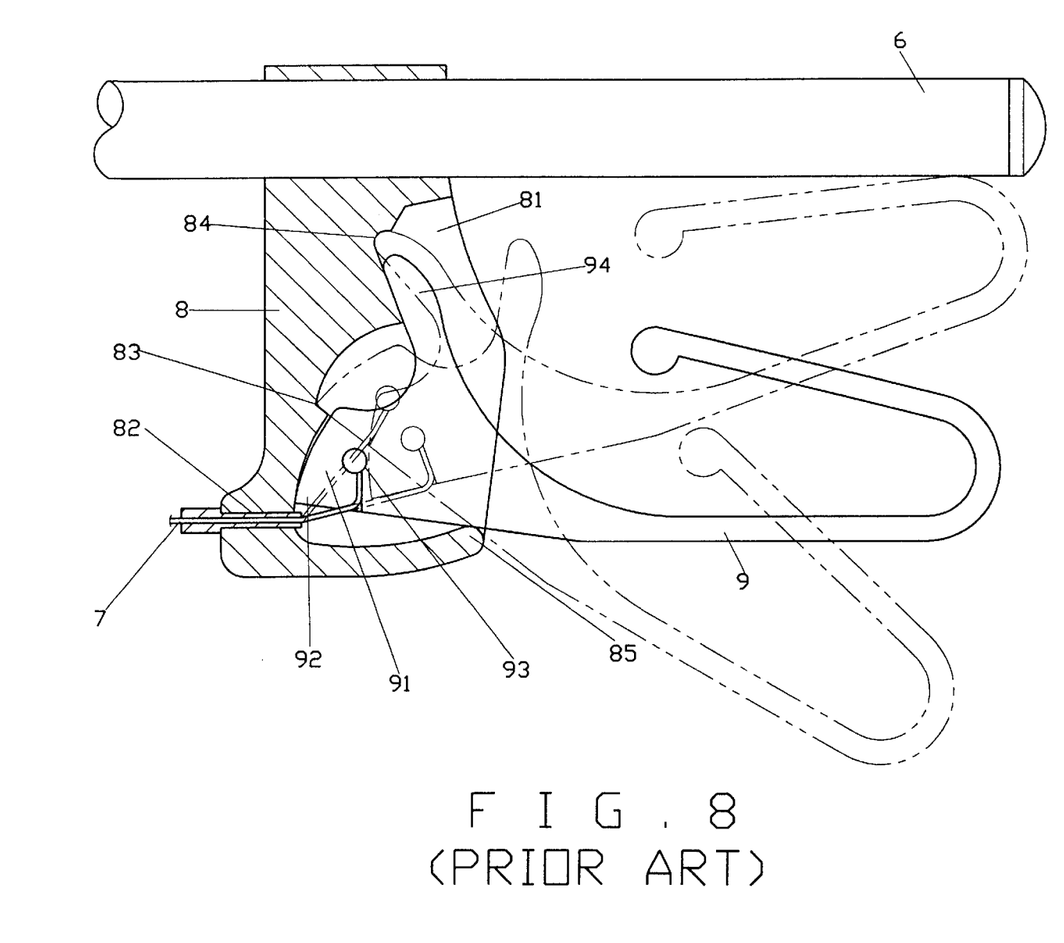
FIG. 8 is a view of the structure and the operation of the previous model of the present invention.

A controller grip of braking is generally provided at a handle of a handy care rollator for elders or those who have walking problems to help them control the movement of the rollator, and on considering that the user might also have problems with the movement of his/her hands. The brake is designed so that it is linked to a braking device either by pushing or pulling the braking grip to ensure safe and convenient use of a rollator. To cope with the requirements as described above, there are various braking grips in the market. As shown in FIG. 7, a prior art complies with the design of a linkage braking device activated either by pushing or pulling the grip. However, if a user wants to remain braking his/her rollator, he/she has to continue pushing or pulling the grip. As illustrated in FIG. 8, an improved design by this Inventor to correct the defect of the prior art, is essentially comprised of a mobile combination of a base (8) and a grip (9), wherein, an accommodation chamber (81) is formed inside the base (8), one mounting hole (82) for a braking wire (7) is provided at one end of the base (8) to penetrate the chamber (81) while a stopper slot (84) and a restriction slot (83) are integrated to the chamber (81) and a stopper edge (85) is formed at the bottom of the chamber (81); a flange (91) with a restriction nose (92) is formed at the lower part of the root to the grip (9), a penetration hole (93) to receive and fasten the braking wire (7) is provided on top of the flange (91), and a crank (94) is provided at the upper part of its root; when the root of the grip (9) is placed into the chamber (81) and the grip (9) is pushed upward, a crank (94) of the grip (9) sinks and holds against the stopper slot (84) which is then used as a support for turning to allow the flange (91) below a displacement for pulling the braking wire (7). Furthermore, if the grip (9) is pushed down, its bottom holds against the stopper edge (85) of the base (8), and the edge (85) is used as the support for turning clockwise to allow the braking wire (7) be pulled by the flange (91), finally, the grip (9) is held steady in its braking status. Once the grip (9) is slightly pulled backward to disengage the restriction nose (92) from the restriction slot (83) to release braking status.

However, said improved design of the braking device in the form of a two-piece mobile combination of the grip (9) and the base (8) though provides the benefits of simplifying the number of members required, the braking wire (7) may escape from its relative defined position when over-drawn due to excessive force is applied to pull or push the grip. In that case, re-positioning is required and causes inconvenience.

SUMMARY OF THE INVENTION

The primary purpose of the present invention is to provide a rollator braking device with a grip which when pushed or pulled to achieve braking by use of connection mechanism at a fixed pivot, and when the grip is pushed down, it remains to be temporarily fixed in braking status while a user of the rollator will not have to push the grip all the time before he/she wants to release the braking. The present invention is essentially comprised of three members of a base, a rod and a grip; wherein, said base is fastened to the handle of the rollator and forms inside an accommodating space, a circular slot and a through hole is provided in the upper accommodating space, a positioning protrusion is formed at the middle section of the inner wall of the space, and a stopper wall is formed at the bottom of the space; the box end of the rod is accommodated in the circular slot and pivoted with a bolt while the other end of the rod is provided with a bore slot to permit penetration of a braking wire. Furthermore, the rod is sandwiched by said grip at its root and pivoted at its middle section with the protruding end at the top of said root of the grip holding against the pivot of the rod, two noses are formed at the middle section of the root, and a holding tongue is formed at one side of the lower end of the root; so that when the grip is pushed downward, the grip holds with the tongue against the stopper wall and becomes a sliding support while the braking wire is pulled by the biased swinging of the rod being pulled by the pivot at its middle section, and the grip is pushed all way down to hold against the rod to form a proper angle for the noses to merely hold against and stop at the positioning protrusion. In practice, the grip is pulled upward just to allow the protrusion end at the top hold against the pivot of the rod, and forms two-point restriction by two pivots located in the middle sections of both the pivot to the rod and the grip, further to forthwith swing the rod with its pivoted bolt along with the pulling of the grip so to draw the braking wire; the braking wire can be also drawn when the grip is pushed downward to hold against the stopper wall with the tongue as a sliding support, further to swing the rod by means of those two pivots, and if the grip is pushed down to form a proper angle with the rod so that the protrusion end just stops at the positioning protrusion to temporarily prevent the grip from being pulled back so that the user may release his/her hand with the rollator in braking status.

DETAILED DESCRIPTION OF THE INVENTION

Figure 1:
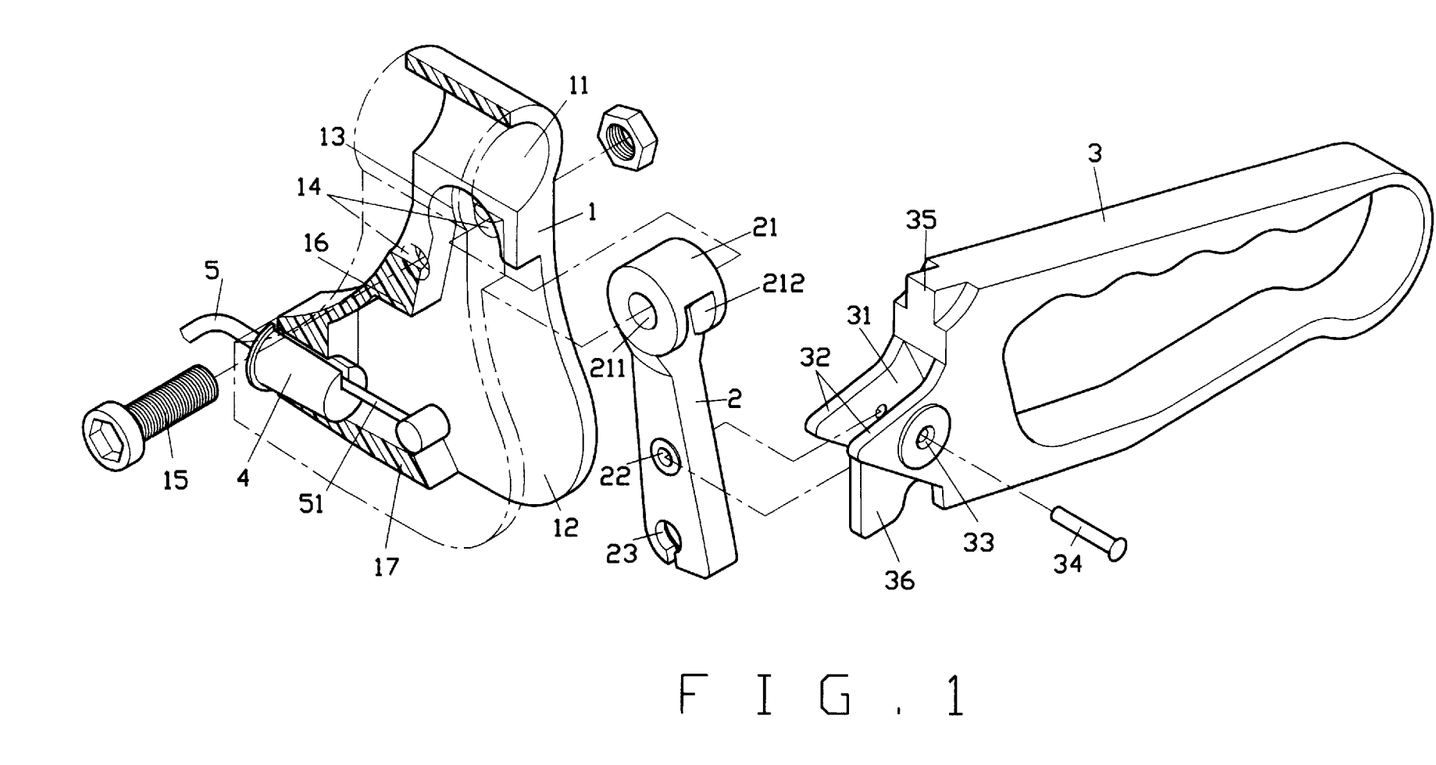
FIG. 1 is a schematic view of the structure of the present invention.

Referring to FIG. 1 showing the structure of a braking grip of the present invention is essentially comprised of a base (1), a rod (2) and a grip (3); wherein, the base (1) forms a loop (11) at its top side, and at its rear end recessed to from an accommodation space (12) while at where below its front end a block (4) inserted and penetrated through with a braking wire (5) with an inner cable (51) of the braking wire (5) invading into the space (12); a circular slot (13) is provided at the front end on the top of the space (12) with an externally lateral penetration hole (14) as a pivot to a bolt (15); a positioning protrusion (16) is formed integrally at the middle section of inner wall of the space (12), and a stopper wall (17) in proper thickness is provided at the bottom of the space (12).

At the box end of the rod (2), a circular pivot (21) is formed with its center and one side respectively provided with a pivot hole (211) and a slot (212), a pin hole (22) and a corresponding slot (23) are formed respectively in the middle section and the lower end of the connection rod (2).

A trough (31) with its width corresponding to that of the connection rod (2) is formed at the root of the grip (3) and guarded by a pair of noses (32), each of the noses (32) has a pivot hole (33) to receive a pivot pin (34), a protrusion end (35) extends from the upper end and a stopper tongue (36) is at the lower end of the grip (3).

Figure 2:
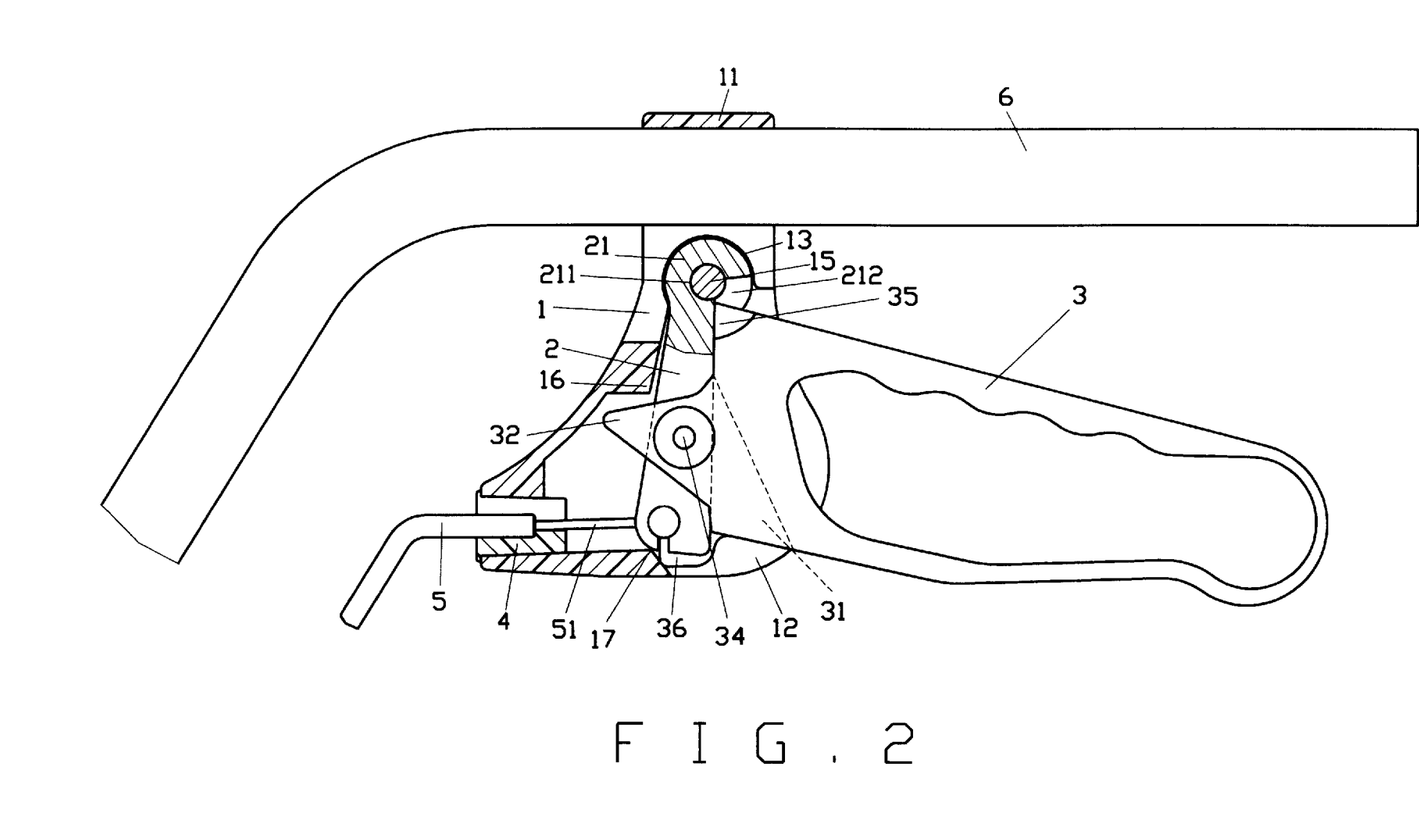
FIG. 2 is a schematic view of the present invention in its original combination.

The trough (31) is used for the grip (3) to fit into the connection rod (2) which is connected with a pivot pin (34) penetrating through the relative pivot hole (33) and the pin hole (22). So to pivot both of the grip (3) and the connection rod (2) while allowing the protrusion end (35) at the upper end of the grip (3) penetrated to hold against in relation to the slot (212) of the pivot (21) of the connection rod (2). The base (1) is capped on a handle (6) with the loop (11). And the pivot (21) of the connection rod (2) is placed into the circular slot (13) of the space (12) while the loop (11) is also fastened by means of the bolt (15) penetrating the through hole (14) and the pivot hole (211) at the pivot (21), so that the pivot (21) used as a support for the connection rod (2) to swing. The inner cable (51) of the braking line (5) penetrating through the space (12) is secured by the corresponding slot (23) at the lower end of the connection rod (2). Before the grip (3) being pulled or pushed, the original combination status is as shown in FIG. 2, wherein, the stopper tongue (36) at the lower end of the grip (3) is used to hold against the stopper wall (17) of the base (1) to achieve a static status.

Figure 3:
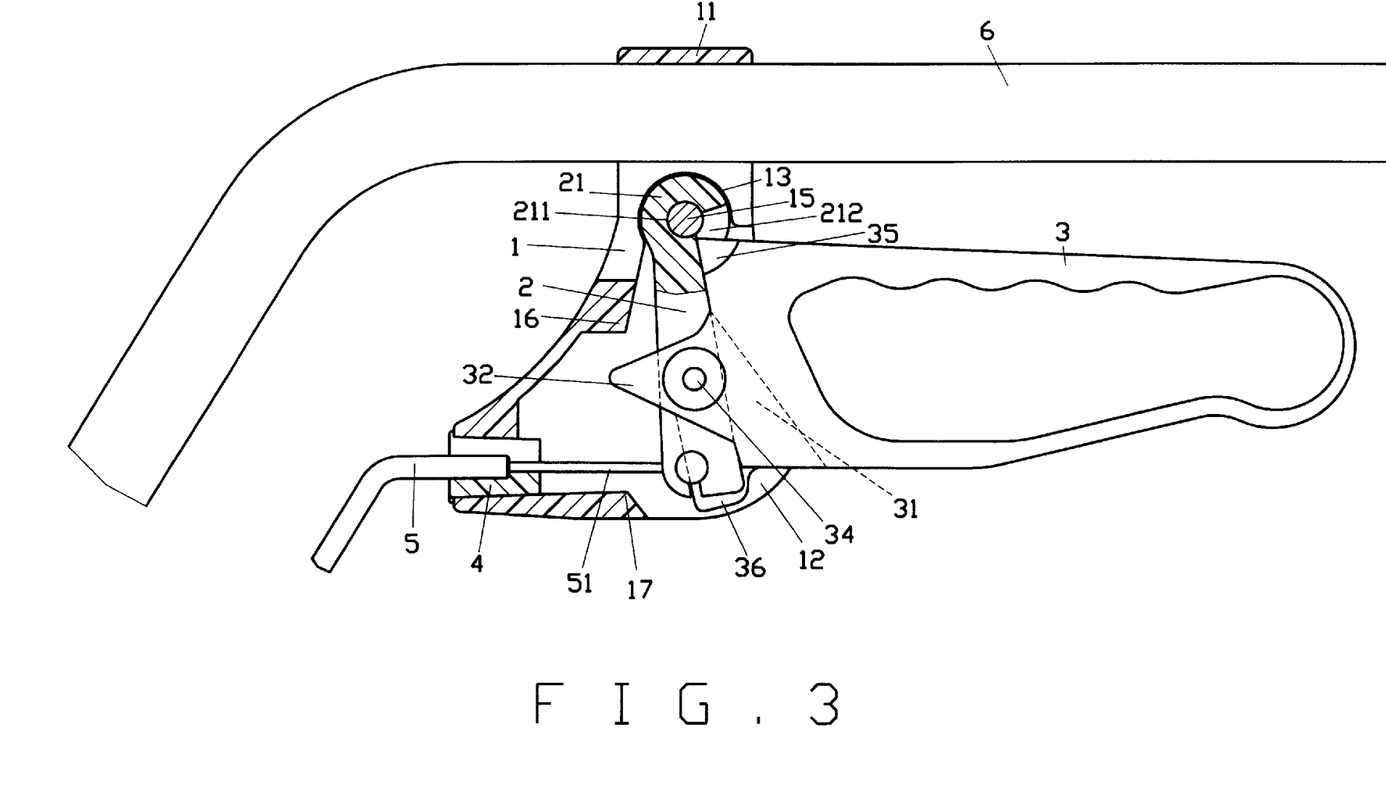
FIGS. 3 through FIG. 6 are views of a preferred embodiment of the present invention in operation.

Furthermore, once the grip (3) is pulled upward as shown in FIG. 3, wherein, the protrusion end (35) holds against the slot (212) of the pivot (21) of the swinging connection rod (2). Since the grip (3) is pivoted to the middle section of the swinging connection rod (2), the swinging connection rod (2) is driven by the grip (3) to swing in conjunction with the rotation by the bolt (15) in the pivot (21), and the cable (51) of the braking line (5) is forthwith pulled by the lower end of the swinging connection rod (2) to achieve the control of braking status.

Figure 4:
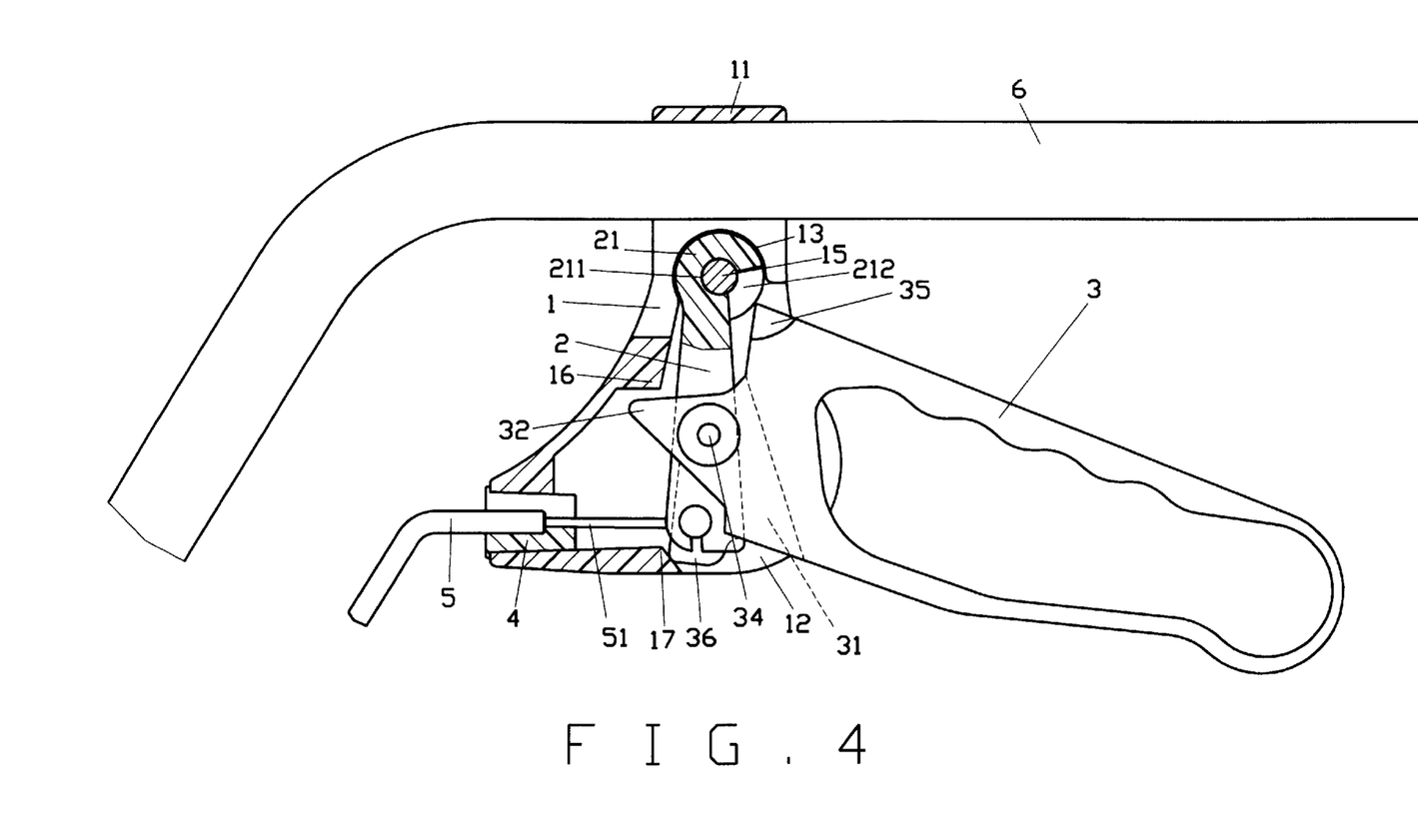
Figure 5:
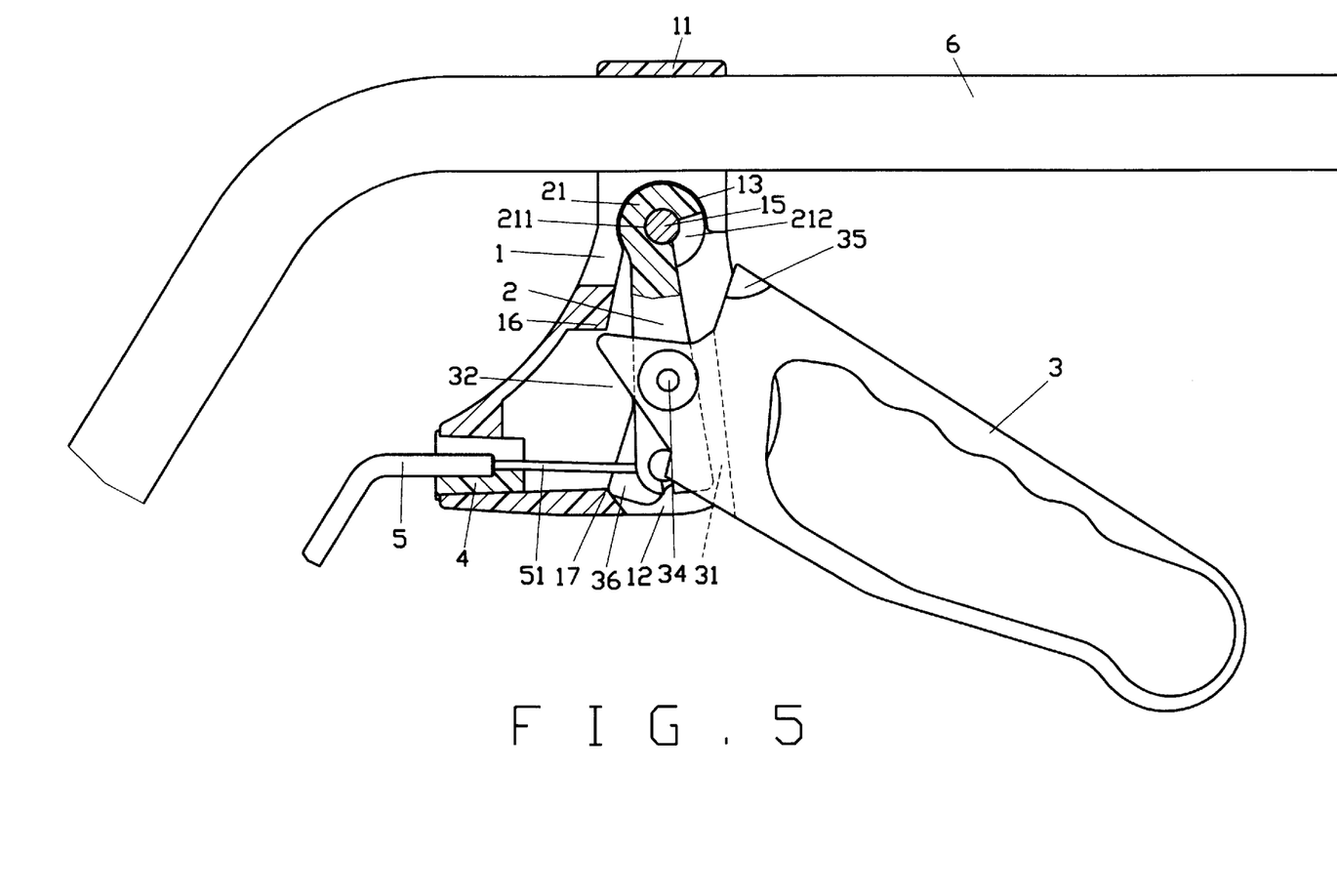
Figure 6:
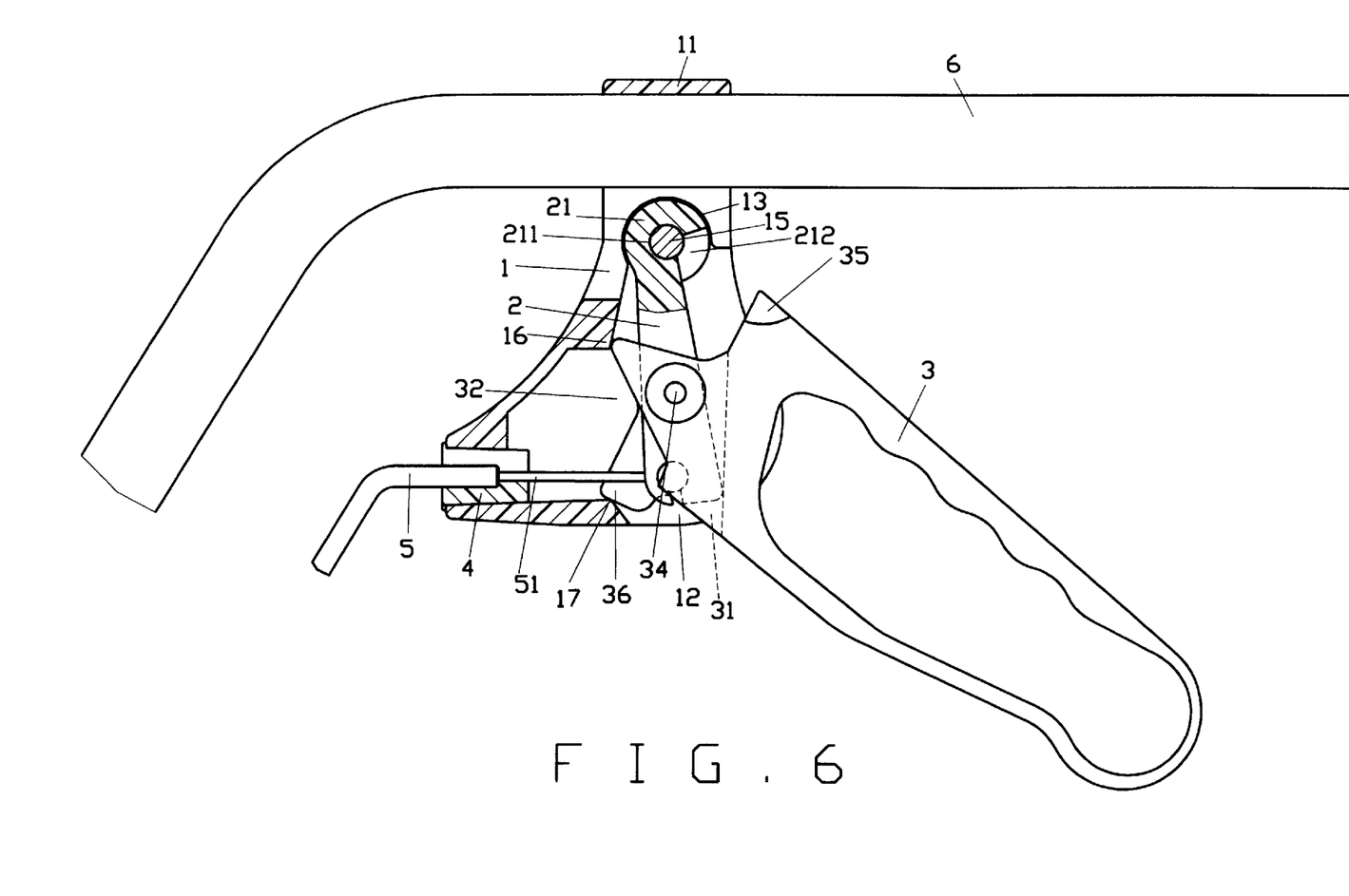

As shown in FIGS. 4 and 5, when the grip (3) is pushed downward, the stopper tongue (36) of the grip (3) holds against the stopper wall (17) of the base (1) to form a sliding support. When the connection rod (2) swings as driven by the pivot point at the middle section, thus the root of the grip (3) travels a lateral movement and the cable (51) of the braking wire (5) is pulled by the rod (2) to achieve the braking. Furthermore, when the grip (3) is continuously pushed downward until the lower end of the connection rod (2) holds against the inner end of the trough (31) to get in position at a proper angle, and the noses (32) move to the outer end of the positioning protrusion (16), then released as illustrated in FIG. 6, the noses (32) at the root of the grip (3) holds against the positioning protrusion (16) of the base (1) and remains in that status for the time being. The cable (51) of the braking wire (5) is pulled in braking status, so the user may sit down by holding the rollator or do something else without having to push the grip (3).

I claim:

1. A brake actuation assembly for mounting on a handle of a rollator, comprising:
   (a) a base having a pair of spaced wall portions defining a accommodation space therebetween, said base having a positioning protrusion extending into an upper portion of said accommodation space and a stopper wall extending into a lower portion of said accommodation space;
   (b) a longitudinally extended rod disposed in said accommodation space between said spaced wall portions of said base, said rod having a first end portion pivotally coupled to said base for displacement within said accommodation space and a second end portion coupled to a brake cable, said rod having formed therethrough a pin hole spaced longitudinally from said first and second end portions; and,
   (c) a grip coupled to said rod and displaceable relative to said base, said grip having a trough formed between a pair of extending nose portions in an end of said grip for receiving said rod therein, said rod being pivotally coupled between said nose portions through said pin hole, said grip having a protrusion formed at an upper portion of said end of said grip and spaced from said nose portions for interfacing with said first end portion of said rod to form a first fulcrum for displacement of said grip in a first direction toward the rollator's handle to actuate a brake, said grip having a stopper tongue formed at a lower portion of said end of said grip and spaced from said nose portions for interfacing with said stopper wall to form a second fulcrum for displacement of said grip in a second direction away from the rollator's handle to actuate the brake, said pair of nose portions engaging said positioning protrusion responsive to said grip being displaced a predetermined distance in said second direction to maintain an actuated condition of the brake, said nose portions being disengaged from said positioning protrusion to release the brake responsive to said grip being displaced in said first direction.

* * * * *